Figure 1:
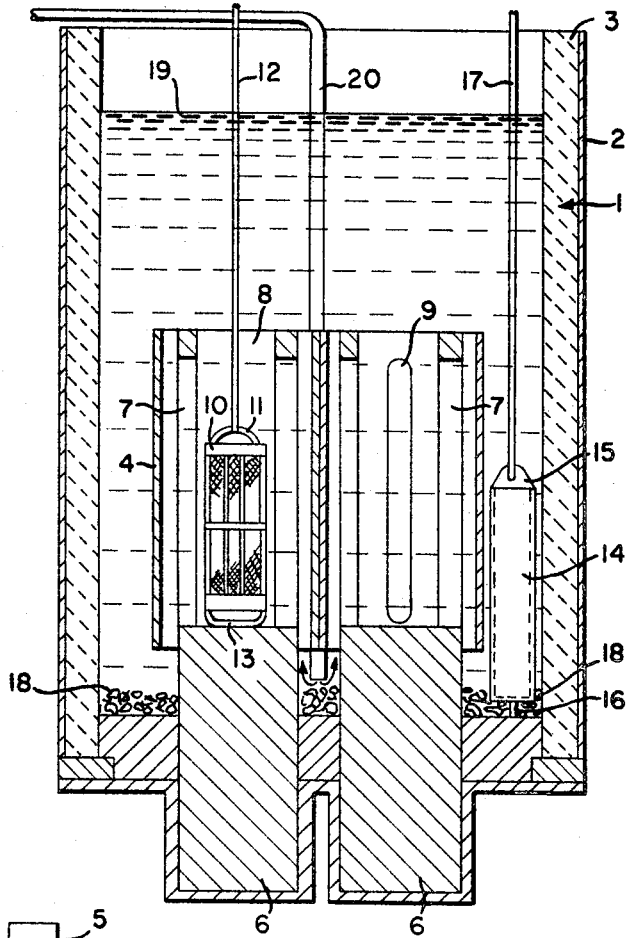

Sept. 3, 1968 C. T. GALLINGER 3,400,060
METHOD FOR REMOVING SOLID PARTICULATE MATERIALS
FROM FUSED ELECTROLYTES
Filed Dec. 29, 1964

INVENTOR
CLYDE T. GALLINGER

BY *Amos G. Cole*

AGENT

United States Patent Office 3,400,060
Patented Sept. 3, 1968

3,400,060
METHOD FOR REMOVING SOLID PARTICULATE MATERIALS FROM FUSED ELECTROLYTES
Clyde T. Gallinger, Niagara Falls, N.Y., assignor to E. I. du Pont de Nemours and Company, Wilmington, Del., a corporation of Delaware
Filed Dec. 29, 1964, Ser. No. 421,901
3 Claims. (Cl. 204—60)

This invention relates to electrolysis cells which are operated at high temperatures employing fused metal halide electrolytes. More particularly, it relates to a method for removing undesired particulate solid materials from such fused electrolytes without removing the latter from the cells.

Fused metal halide electrolysis cells such as the cells of the "Downs" type employed in the electrolysis of fused sodium chloride electrolytes to produce sodium and chlorine, are customarily constructed without a bottom outlet. The salt or salt mixtures employed as electrolyte are fed in at the top and the electrolysis products, e.g., sodium and chlorine, are removed from the top. Consequently, any refractory solid materials which find their way into the electrolyte, either initially or during operation of the cell, will remain as such. If they are more dense than the electrolyte, which is generally the case, they will settle to the bottom of the cell.

Some such relatively dense solids or sludge material result from impurities in the salts fed to the cell. However, the major source thereof is the refractory cell lining, generally a mortared brick lining. Such a lining is employed to shield the outer steel shell of the cell from the fused electrolyte since steel is rapidly consumed by fused electrolyte containing free halogen. Refractory cell linings tend to spall during operation of the cell, releasing brick chips and more finely divided refractory material which settle to the bottom of the cell. The disintegrating and spalling action of the electrolyte upon the lining continues during the life of the cell so that in time the accumulation of brick chips and semi-liquid sludge in the bottom of the commercial cell may amount to hundreds of pounds.

Substantial accumulations of such refractory solids in the cell bottom are highly undesirable in that they seriously reduce normal electrolyte circulation. This results in reduced cell efficiency and cell over-heating which shortens equipment life. The build-up of such solids and sludge in the cell bottom, if permitted to continue, eventually so reduces cell efficiency as to make further operation uneconomic. When this point has been reached, the practice has been to tear down and rebuild the cell.

It is an object of the invention to provide an effective way of removing accumulations of such solid materials from cells of the above type whereby the efficiency and useful life of the cell are increased. A particular object is to provide a practical way of filtering such solids from the fused electrolyte while the latter remains in place within the cell. Still further objects will be apparent from the following description.

The objects of the invention are accomplished by strategically positioning one or more open-top filter baskets in the fused electrolyte, causing a stream of electrolyte carrying such solids in suspension to flow over the open top of the filter basket, allowing the suspended solids to settle in the basket and then removing the filter basket with the filtered solids therein from the cell. One or more walls and/or the bottom of the filter basket should be provided with perforations of a size which will cause the solids to be retained in the basket, while permitting effective drainage of electrolyte from the basket as the latter is raised out of the electrolyte. The cell electrolyte should of course be maintained in the fused or molten condition during the solids removal operation.

Figure 2:
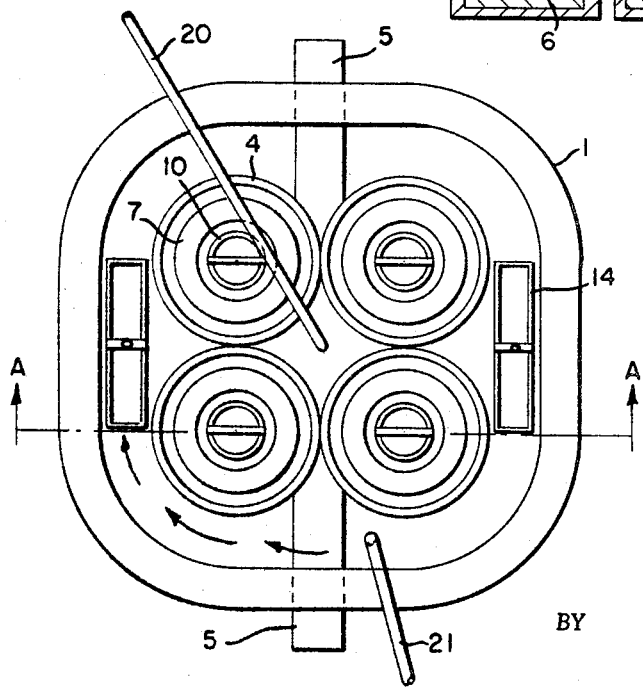

The invention will be better understood from the following more detailed description considered with the accompanying drawings of which;

FIG. 1 is a vertical cross-sectional view, along line A—A of FIG. 2, of a four-anode type fused salt sodium cell in which the usual products collector and diaphragm assembly has been removed and in which is shown strategically positioned filter baskets together with means for causing streams of electrolyte carrying suspended solids to flow over the filter baskets as is done in practicing the method of the invention.

FIG. 2 is a top plan view of the structure shown in FIG. 1.

In the drawings, numeral 1 indicates generally the cell wall composed of an outer steel shell 2 and an inner refractory lining 3. The latter is usually constructed of refractory bricks which are mortared in place using a refractory cement. Positioned within the cell by means not shown are circular cathodes 4 within each of which is disposed an anode 6, the upper portion 7 of which is provided with a hollow core 8 and with 4 vertical slots 9 to facilitate circulation of electrolyte. The assembly of cathodes 4 is provided with cathode arms 5 which extend through the side walls of the cell. In operation, fused electrolyte is maintained in the cell, e.g., to the level indicated by broken line 19, while direct current is applied to cathode arms 5 and to the bases of anodes 6 in conventional manner by means not shown. The usual product collector assembly for collecting sodium rising from the cathodes and chlorine rising from the anodes, and also the cell diaphragms normally suspended from and constituting part of the products collector assembly, are not shown in the drawings since the collector assembly, including diaphragms, is normally removed from the cell during the operations by which refractory solid materials are removed from the electrolyte in accordance with the invention.

An accumulation of particulate refractory solid materials such as brick chips and debris is indicated in the bottom of the cell by the numeral 18. Such materials can be readily removed in accordance with the invention by means of open-top filter baskets 10 and 14. A cylindrical filter basket 10 is positioned at the bottom of each anode hollow core 8. Such baskets are conveniently constructed of a ribbed frame work supporting cylindrical side walls made of steel filter screen. The tops of each basket 10 is provided with a lifting handle 11 which may be engaged by hooked rod 12 during placement of the basket within the anode or for removing it from the cell. The bottom of such a basket filter is conveniently made solid and is provided with a dumping handle 13 for use in dumping the contents of the basket filter after the latter has been removed from the cell.

A rectangular filter basket 14 is shown positioned between cell lining 3 and cathodes 4 by means of rod 17 which is integrally attached, e.g., by welding, to lifting handle 15 of basket 14. The side of basket 14 adjacent cathodes 3 is constructed of a steel filter screen while its opposite side, end walls and bottom are preferably of solid sheet steel, although any of the sides, end walls and bottom can be constructed of steel filter screen if desired. The bottom of filter basket 14 is provided with a dumping handle 16 for use in dumping the basket when it is removed from the cell. FIG. 2 shows two filter baskets 14 and 4 filter baskets 10.

The purpose of pipe 20, shown inserted to the bottom of the well between the anodes, is to deliver a stream of air or other inert gas sufficiently strong to force a stream of electrolyte with the solid materials suspended or entrained therein upward between the anodes. As such electrolyte stream spills outward across the tops of the anodes its velocity decreases sufficiently for the entrained solids to settle by gravity into basket filters 10. Similarly, the purpose of pipe 21, shown in FIG. 2, is to deliver a stream of air to the bottom of the cell between cell lining 3 and cathodes 4, and thereby cause a stream of electrolyte with entrained solid materials therein to spill over filter basket 14 with the result that such solid materials settle into basket 14. Air pipe 21 may be positioned at a slant towards one filter basket 14 until that basket is filled with solids, after which it can be similarly employed at the opposite side of the cell to fill the other filter basket 14. Alternatively, two such air pipes 21 may be used to fill both baskets 14 simultaneously.

Since the fused electrolyte will be exposed to the air during the filter operations, it will generally be desirable to effect such operations as rapidly as possible. For this reason, there will generally be employed a filter basket in the hollow core of each anode and at least two oppositely positioned filter baskets between the cathode and the cell lining, as indicated in FIG. 2. However, worthwhile solids removal can be effected using only one filter basket positioned in any of the positions indicated and even more than the 6 filter baskets indicated above can obviously be used if desired.

The filter baskets should be strategically positioned in the electrolyte so that their open tops will be in an area where the flow of the induced streams of electrolyte with entrained solids becomes sufficiently reduced for the solids to settle into the filters. Generally, the baskets should be as low in the electrolyte as possible. Furthermore, current should be applied, at least intermittently, to the cell so as to keep the entire electrolyte molten. With the application of current, sodium will be released at the cathode and rise to the surface of the electrolyte where it will burn, and chlorine will be released at the anodes and rise out of the cell. Because of such chlorine release, the electrolyte zone immediately above an anode will be laden with free chlorine. Since fused electrolyte containing free chlorine is very corrosive to steel, the steel rods such as hook rod 12, used to position the baskets in the anode cores and to remove them when they are filled, should be of the removable type so that they can be removed from the electrolyte during the time the baskets are being filled. Furthermore, the heights of filter baskets 10 in anode cores 8 should be no greater than about half the height of the effective electrolysis zone in order to prevent the upper parts of such baskets from extending into the corrosive zone of the electrolyte where free chlorine will be present. The steel rods such as rod 17, used to position filter baskets 14 between the cathodes and cell lining are preferably made integral with the baskets since the integral arrangement facilitates optimum positioning of the baskets. These rods do not pass through electrolyte laden with free chlorine, and therefore, are not subject to the corrosive action of such electrolyte.

As indicated above, at least part of the side walls and/or bottoms of the filter baskets should be provided with perforations which are small enough to effect retention of the solids in the basket but large and numerous enough to permit drainage of the electrolyte from the basket as the latter is removed from the cell. The perforated or "filter" areas of the filter baskets are preferably constructed of steel wire screen of 20 to 50, most preferably 25 to 35, mesh size (U.S. Standard Sieve Series). Such filter screens will effectively retain solids such as brick chips and the usual debris including substantial amounts of semi-solid sludge, while permitting the fused electrolyte to pass through as the filter basket is withdrawn vertically from the electrolyte and the cell.

As indicated previously, hundreds of pounds of such solid materials may accumulate in the bottom of a commercial cell if they are not removed periodically. When practicing the removal of such solids periodically in accordance with the invention, it has been possible to more than double the efficient life of a cell over what it would be if such solids were not removed. Substantial accumulation of solids in the cell bottom can be readily determined by testing with probe rods, and such probe testing can be employed as a way of determining when removal of solids should be effected. However, the formation and accumulation of solids goes on more or less continuously during operation of the cell, although such formation and accumulation will ocuur more rapidly in some cells than in others. In general, it is more practical to effect solids removal periodically on a more or less regular schedule so as to avoid any accumulation sufficiently great to reduce significantly the natural circulation of electrolyte in the cell. When removal of solids is effected about every 100 days, the take-out of solids will average about 40 to 50 lbs. and long effective cell life can thereby be realized.

The embodiments of the invention in which an exclusive property or privilege is claimed are as follows:

1. In a process for electrolyzing a fused metal halide electrolyte contained within a cell having a protective refractory lining exposed to said electrolyte, which lining spalls during operation of said cell to produce particulate refractory solid materials which accumulate and settle in said electrolyte with resultant reduction in the nautral circulation of electrolyte in the cell and reduction in the cell efficiency, the improvement comprising removing said accumulation of said solid material by positioning at least one open-top filter basket within said electrolyte, said filter basket being adapted to retain therein said solid material while permitting said fused electrolyte to flow therethrough, entraining said solid material in a stream of said electrolyte and causing said stream with said entrained solid material to flow over the top of said filter basket, whereby said solid material settles into said filter basket, and withdrawing said filter basket with said solid material retained therein vertically from said electrolyte and the cell, said electrolyte being maintained in a fused state during the aforesaid operations.

2. A process according to claim 1 wherein the removal of accumulated particulate solid material from the electrolyte is effected periodically over the life of the cell and at such frequency as will prevent accumulation of said solid material to such an extent as will significantly reduce the cell efficiency and the natural circulation of electrolyte in the cell.

3. A process according to claim 1 wherein the electrolyte comprises fused sodium chloride which is electrolyzed to produce metallic sodium and chlorine as products and wherein the removal of accumulated particulate solid material from the electrolyte is effected periodically over the life of the cell and at such frequency as will prevent accumulation of said solid material to such an extent as will significantly reduce the cell efficiency and the natural circulation of electrolyte in the cell.

References Cited
UNITED STATES PATENTS

| | | | |
|---|---|---|---|
| 588,035 | 8/1897 | Thum | 204—276 |
| 2,787,592 | 4/1957 | Burkhardt | 204—245 |
| 2,951,021 | 8/1960 | Di Pietro | 204—247 |

JOHN H. MACK, *Primary Examiner.*

D. R. VALENTINE, *Assistant Examiner.*